United States Patent
Iliffe-Moon (10) Patent No.: US 12,090,849 B2
(45) Date of Patent: Sep. 17, 2024

(54) USER INTERFACE FOR A VEHICLE AND A VEHICLE

(71) Applicant: Bayerische Motoren Werke Aktiengesellschaft, Munich (DE)

(72) Inventor: Etienne Iliffe-Moon, Menlo Park, CA (US)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 279 days.

(21) Appl. No.: 17/813,368

(22) Filed: Jul. 19, 2022

(65) Prior Publication Data
US 2023/0021457 A1    Jan. 26, 2023

(30) Foreign Application Priority Data
Jul. 22, 2021    (DE) .......................... 102021118952.7

(51) Int. Cl.
| | | |
|---|---|---|
| *B60K 35/10* | (2024.01) | |
| *B60K 35/00* | (2006.01) | |
| *B60K 35/21* | (2024.01) | |

(52) U.S. Cl.
CPC .............. *B60K 35/00* (2013.01); *B60K 35/10* (2024.01); *B60K 35/211* (2024.01);
(Continued)

(58) Field of Classification Search
CPC ............ B60K 35/211; B60K 2360/334; B60K 35/00; B60K 35/10; B60K 2360/336;
(Continued)

(56) References Cited

U.S. PATENT DOCUMENTS

| | | | | |
|---|---|---|---|---|
| 5,502,457 A | * | 3/1996 | Sakai ................ | G02F 1/133524 385/116 |
| 6,885,439 B2 | * | 4/2005 | Fujieda .............. | G06V 40/1394 382/116 |

(Continued)

FOREIGN PATENT DOCUMENTS

| | | |
|---|---|---|
| DE | 102013213014 A1 | 1/2015 |
| FR | 3067993 | 12/2018 |

OTHER PUBLICATIONS

Geoff Walker, A review of technologies for sensing contact location on the surface of a display (May 15, 2012) p. 413 Journal of the SID.*

*Primary Examiner* — Gertrude Arthur Jeanglaude
(74) *Attorney, Agent, or Firm* — Kieran O'Leary; 2SPL Patent Attorneys PartG mbB (57) ABSTRACT

The invention relates to a user interface for a vehicle adapted to present visible information; the user interface comprises a two-dimensional display for displaying information on a display portion, and an optical faceplate comprising a contact surface, a three-dimensional display surface for displaying information, and an optic light guide material provided between the contact surface and the three-dimensional display surface; wherein the two-dimensional display comprises a pixel arrangement and a cover layer covering the pixel arrangement; wherein the contact surface contacts the display to transmit information from the pixel arrangement to the three-dimensional display surface; wherein the faceplate is integrated into the display. The invention also relates to a vehicle.

15 Claims, 2 Drawing Sheets (52) U.S. Cl.
CPC .. *B60K 2360/334* (2024.01); *B60K 2360/336* (2024.01); *B60K 2360/682* (2024.01); *B60K 2360/688* (2024.01); *B60K 2360/692* (2024.01); *B60K 2360/693* (2024.01); *B60K 2360/695* (2024.01)

(58) Field of Classification Search
CPC ........ B60K 2360/692; B60K 2360/682; B60K 2360/695; B60K 2360/688; B60K 2360/693
See application file for complete search history.

(56) References Cited

U.S. PATENT DOCUMENTS

| | | | |
|---|---|---|---|
| 6,924,752 B2 * | 8/2005 | Gettemy | G06F 3/045 341/20 |
| 7,671,851 B1 * | 3/2010 | Pryor | G06F 3/0312 345/184 |
| 9,435,939 B2 | 9/2016 | Yang et al. | |
| 2006/0250897 A1 * | 11/2006 | Brewer | G04C 17/00 368/82 |
| 2006/0251365 A1 * | 11/2006 | Brewer | G02B 6/08 385/116 |
| 2010/0201893 A1 | 8/2010 | Pryor | |
| 2014/0347303 A1 * | 11/2014 | El Khoury | B60K 35/10 345/184 |
| 2017/0052617 A1 | 2/2017 | Okuzumi et al. | |
| 2017/0059864 A1 * | 3/2017 | Takahashi | B60K 35/00 |
| 2020/0079216 A1 | 3/2020 | Knittl et al. | |

* cited by examiner

USER INTERFACE FOR A VEHICLE AND A VEHICLE

CROSS-REFERENCE TO RELATED APPLICATION

This application claims priority to German Application 10 2021 118 952.7, which was filed on Jul. 22, 2021. The content of this earlier filed application is incorporated by reference herein in its entirety.

FIELD

The present invention relates to a user interface for a vehicle. The present invention also relates to a vehicle, comprising such a user interface.

BACKGROUND

A known user interface can comprise a two-dimensional flat display to display information and/or a physical button or knob to capture user input and to provide a physical affordance for the user.

Two-dimensional displays are used to present a variety of information to the driver and/or other passengers of the vehicle. Two-dimensional displays can comprise a touch functionality to capture user input. Thereby, the two-dimensional display with touch functionality, also called touchscreen, can provide a part of the user interface with a large number of functions. During driving it appears to be difficult to make use of the large number of functions, in particular for the driver who needs to pay attention to driving the vehicle. Furthermore, due to a lack of feedback perceivable by a user, e.g., the driver, in case of a touch sensitive display it appears difficult for the user to perform an accurate input, e.g., with a user's finger. For the same reason, the driver is distracted and needs to pay visual and cognitive attention to operate a touch sensitive display.

A two-dimensional touchscreen display typically comprises a plurality of layers: the display module for generating the image, e.g., TFT LCD, LCD, OLED, E-Ink; capacitive sensing layers, e.g., a transmitter and a receiver; an adhesive layer between each other layer; and the display glass, i.e., an external cover layer that the user interacts with; and optionally optical coatings to provide anti-reflection and/or a visual treatment. Between any two layers, an optical boundary exists at which reflection and/or refraction can occur. This can cause light transmission losses and a loss of image quality, e.g., brightness, contrast, color, etc. Furthermore, displays typically have an area around the active area, i.e., around the pixel arrangement, acting as a border and providing structural features, electronic circuitry, etc. This border is typically concealed by a bezel. The bezel can be a physical frame of a black mask which can often be seen behind the display glass. The presence of the bezel and the size of bezel can influence the appearance of the display negatively.

Thus, such a two-dimensional display comprises a plurality of aspects that needs to be improved.

SUMMARY

Physical buttons provide a physical affordance which provides important benefits, in particular when used in a vehicle. E.g., user-friendliness by providing physical stability to a finger interacting with the button, reduced distraction as opposed to using a touchscreen, and familiarity as the button's physical location and function is substantial and consistent. The physical button allows a blind operation since the user memorizes and/or feels where to find the button, how to operate it and/or which function it has. Thus, compared to a touch sensitive display, a physical button enables a favorable haptic perception. In addition, a physical button may also be an aesthetic feature of the vehicle. However, physical buttons have properties that may be disadvantageous, such as having a dedicated function and a lack of relationship to the digital user interface, e.g., to content that is displayed on a two-dimensional display.

US 2020/0079216 A1 discloses an operating apparatus that comprises a touchscreen and an operating knob in the region of the touchscreen, wherein the knob comprises a sidewall with a plurality of luminous outputs. The touchscreen comprises a transparent panel and a pixel matrix. The panel can have the shape of the knob and the pixel matrix is shaped together with the panel. However, a shaped pixel-matrix is cost-intensive. Furthermore, the content that is to be displayed need to be adapted to be displayed adequately, i.e., undistorted, on the surface of the knob. Alternatively, the panel can have the shape of the knob while the pixel matrix is flat, wherein a cavity between the pixel matrix and the panel is to be filled by light-guiding elements to guide light from the pixel-matrix to the panel. However, the cavity between the pixel matrix that is to be filled implies additional optical boundaries at which additional reflection and/or refraction might occur. This can lead to optical losses.

The object of the invention is to provide a user interface that allows user-friendly interaction, is cost-effective to manufacture, provides improved light transmission and an improved appearance.

The object is achieved by the features of the independent claims. Embodiments of the invention are given in the dependent claims, in the figures and in the description.

The user interface for a vehicle is adapted to present visible information. The user interface comprises a two-dimensional display for displaying information on a display portion, and an optical faceplate comprising a contact surface, a three-dimensional display surface for displaying information, and an optic light guide material provided between the contact surface and the three-dimensional display surface. I.e., the faceplate comprises the contact surface, the three-dimensional display surface, and the optic light guide material. The two-dimensional display comprises a pixel arrangement and a cover layer covering the pixel arrangement. The pixel arrangement is covered to, e.g., protect the pixel arrangement, to provide a sensitive layer, and/or to improve mechanical and/or optical properties of the display. The contact surface contacts the display to transmit information in the form of light from the pixel arrangement to the three-dimensional display surface. I.e., the two-dimensional display comprises a contact portion that contacts the contact surface of the faceplate to transmit light that is emitted by the pixel arrangement corresponding to contact portion of the two-dimensional display via the contact surface and the light guide material to the three-dimensional display surface. The contact portion of the two-dimensional display transmits information to be presented by the three-dimensional display surface to the faceplate by emitting light that is receivable by the contact surface, and the contact portion is covered by the faceplate. The display portion is the part of the two-dimensional display which remains visibly perceivable by a user to deliver information that is two-dimensionally presented by the two-dimensional display. The faceplate is integrated into the display. By integrating the faceplate into the display, the user interface has a physical, three-dimensional form. The faceplate provides a physical affordance of the user interface and, at the same time, enables output of visibly perceivable information at the three-dimensional display surface.

According to the invention, the cover layer comprises a cutout forming a recess of the two-dimensional display. I.e., the cover layer comprises a through-hole. Typically, the cover layer is an at least locally flat, homogeneously appearing and solid body. In contrast, the cover layer according to the invention comprises a cutout to receive the faceplate in the recess. The cutout can be arranged so that the recess is circumferentially surrounded by the cover layer or so that the recess is formed at an edge of the cover layer, i.e., so that the recess is not circumferentially but partially surrounded by the cover layer.

According to the invention, the contact surface of the faceplate is arranged in the recess of the two-dimensional display. I.e., the faceplate is inset in the display. Thus, in contrast to arranging the faceplate on the cover layer, the faceplate is arranged in the recess. Thus, the contact portion of the display is not comprised by the cover layer but by an underlying layer beneath the cover layer. The user interface according to the invention benefits from a reduced number of layers between the pixel arrangement, where the information is emitted, and the three-dimensional display surface, where information is delivered to. To inset the faceplate has the advantage of reducing the number of layers between the contact surface of the faceplate and the pixel arrangement, i.e., it eliminates an additional layer, i.e., the cover layer, e.g., a display glass, and potentially a layer of adhesive. Reducing the number of layers reduces optical losses. Thus, the visual quality of the image that is depicted on the three-dimensional display surface is improved. In contrast to the prior art, the pixel arrangement does not need to be shaped specifically to form a three-dimensional surface such as a knob, i.e., the display can comprise any known pixel arrangement. This leads to a cost-effective user interface. The recessed arrangement of the faceplate can improve the appearance of the user interface.

Optionally, the faceplate comprises a base provided between the contact surface and the three-dimensional display surface, the base has a height, and the cover layer has a width; wherein the height of the base is equal to, or larger than, the width of the cover layer to provide a seamless arrangement of the faceplate and the cover layer. If the height of base is equal to the width of the cover layer, the three-dimensional display surface and the cover layer are arranged to be in alignment with each other so that a user can move a finger smoothly from the cover layer to the three-dimensional display surface without sensing a junction between the faceplate and the display portion, which can be beneficial if the display portion and the three-dimensional display surface are touch sensitive. If the height of the base is larger than the width of the cover layer, a distinguished physical affordance for the user is provided.

Optionally, the faceplate comprises a base provided between the contact surface and the three-dimensional display surface; wherein the base is inset in the cutout to provide a reliable arrangement of the faceplate in the recess. In this embodiment, the base and the cutout forming the recess are shaped so that the base can be inset in the recess, i.e., the cross-section of the base is equal to, or smaller than, the cross-section of the recess.

Optionally, the faceplate comprises a base provided between the contact surface and the three-dimensional display surface, wherein the three-dimensional display surface has a cross-sectional area larger than a cross-sectional area of the base. In this embodiment, a junction is formed between the faceplate and the display portion, i.e., between the base and a lateral surface of the recess, and it is possible that the junction between the cover layer and the faceplate can be concealed effectively. Alternatively or additionally, the faceplate comprises a projection so that the three-dimensional display surface overlaps the cover layer to conceal the junction between the faceplate and the cover layer. These embodiments can improve the elimination of visual artifacts at the junction.

Optionally, the recess comprises a lateral surface that defines the boundary of the cutout; wherein the lateral surface extends perpendicular, with an acute angle, or with an obtuse angle, to a front face of the cover layer to provide several possible arrangements of the faceplate within the recess. The lateral surface extending perpendicular to the front face can be particularly cost-effective and facilitate an efficient manufacture of the user interface. The lateral surface extending an acute or obtuse angle to a front face of the cover layer can provide optical and/or mechanical improvements of the faceplate being mounted at the display.

Optionally, the faceplate and the lateral surface are fitted together via a butt joint or a lap joint. A butt joint is a junction in which edges of the faceplate and the cover layer are parallel to each other, e.g., perpendicular or at some angle inwards to a front face of the cover layer. A lap joint is a junction in which the faceplate or the cover layer has a step to shift or conceal the junction so that the junction comprises a section that is parallel to the plane of the display rather than normal, i.e., perpendicular, to the display.

Optionally, the user interface comprises a filler and/or a sealant provided between the contact surface of the faceplate and the display to improve the mechanical fixation of the faceplate and/or to improve light transmission between the pixel arrangement and the contact surface. Optionally, the filler and/or the sealant is optical index matching to match the refractive index of the faceplate and/or underlying layers of the display between the faceplate and the pixel arrangement.

Optionally, the user interface comprises an optionally index matching adhesive provided between the contact surface and the display to provide a bonding between the faceplate and an underlying layer of the display provided between the faceplate and the pixel arrangement. Optionally the adhesive is index matching, i.e., the refractive index of the cured adhesive matches, or is similar to, the refractive index of the faceplate and/or the underlying layer. This embodiment, enables a reliable and cost-effective attachment of the faceplate and optionally creates an optically homogeneous path and therefore improves light transmission. In another embodiment, it is possible to mechanically attach the faceplate.

Optionally, the light guide material of the faceplate comprises fiber optics elements having an axis each; wherein the fiber optics elements are arranged so that each of the axes of the fiber optics elements enclose an angle of less than 90°, preferably less than 80°, with the three-dimensional display surface, and/or each of the fiber optics elements is curved between the contact surface and the three-dimensional display surface. Typically, the contact surface is a flat surface and light is coupled in, from the pixel arrangement, perpendicular to the contact surface. In this embodiment, it is possible to direct light that is input at the contact surface along an optical path that is not perpendicular to the contact surface. Therefore, light can be directed in a controlled manner from a specific section of the contact surface to a specific region of the three-dimensional display surface.

This can be utilized to conceal a junction between the faceplate and the display portion. Furthermore, the visual appearance of the user interface and the quality of the presented information is improved, and visual artifacts and aberrations when the faceplate is viewed off-axis can be reduced.

Optionally, the light guide material of the faceplate comprises portions with differently oriented fiber optics elements. This embodiment is particularly effective to present information that is displayed on the three-dimensional display surface in dependence of the viewing angle. Different zones on the faceplate are created that are optimized for different viewing angles and/or different user positions. This is achieved by controlling the orientation of the optical fibers across the different sections of the faceplate. E.g., a first portion of the faceplate comprises fiber optics elements that are oriented in a first direction and a second portion of the faceplate comprises fiber optics elements that are oriented in a second direction different than the first direction to enable a user looking from the first direction to perceive information that is displayed on the first portion of the three-dimensional display surface. This embodiment can improve the appearance of the user interface to conceal a junction between different circumferential section of the faceplate and the display portion.

Optionally, the faceplate comprises a center, and the fiber optics elements are oriented radially outwardly from the center. In this embodiment, the fiber optics elements are oriented to guide the input light and expand it outward around an area in front of the three-dimensional display surface. This expands effectively laterally or transversely offsets the light output, and can optionally be used to conceal a non-active area of the display.

Optionally, the display comprises a bezel surrounding and/or covering at least a part of the pixel arrangement; the faceplate comprises a projection so that the three-dimensional display surface overlaps the bezel; and the fiber optics elements are arranged to extend from the contact surface to the projection. In this embodiment, light can be directed in a controlled manner from a specific section of the contact surface the projection that overlaps the bezel. I.e., even though the projection is not arranged above the pixel arrangement and thus no light can be coupled into the faceplate below the projection, information can be displayed at the projection of the three-dimensional display surface, since fiber optics elements are arranged to guide light from the contact surface to the projection. This embodiment can eliminate the appearance of the bezel so as to provide a bezel less or bezel free appearance, thus the appearance of the user interface is improved. In this embodiment, the effective display area appears maximized and to extend across the whole three-dimensional display surface. Furthermore, this can improve how the faceplate is integrated in the overall design of the user interface and content or media appears to fill the entire three-dimensional display surface.

Optionally, the fiber optics elements are arranged to conceal the bezel so that the bezel is not visibly perceivable by a user to further improve the appearance of the user interface. In this embodiment, light can be directed in a controlled manner from a specific section of the contact surface to a specific overlap section of the three-dimensional display surface that can overlap the bezel. I.e., even though the overlap section of the three-dimensional display surface is not arranged above the pixel arrangement and thus no light can be coupled into the faceplate below the overlap section, information can be displayed at the overlap section of the three-dimensional display surface, since fiber optics elements are arranged to guide light from the contact surface to the overlap section.

According to the invention, a vehicle comprising a user interface. The vehicle can comprise as a CID or a panorama display, steering wheel controller (MFL), a panorama head-up display (PHUD) and/or a personal information display (PID) which comprises the user interface.

Further features of the invention are given in the claims, in the figures, and in the description of the figures. Features and combinations of features as describes above and features and combinations of features as disclosed in the figures and described with relation to the figures can be used as such or combined without leaving the scope of the invention.

BRIEF DESCRIPTION OF THE DRAWINGS

The figures show.

In the figures, the same and functionally similar elements are used with the same reference signs.

DETAILED DESCRIPTION

Figure 1:
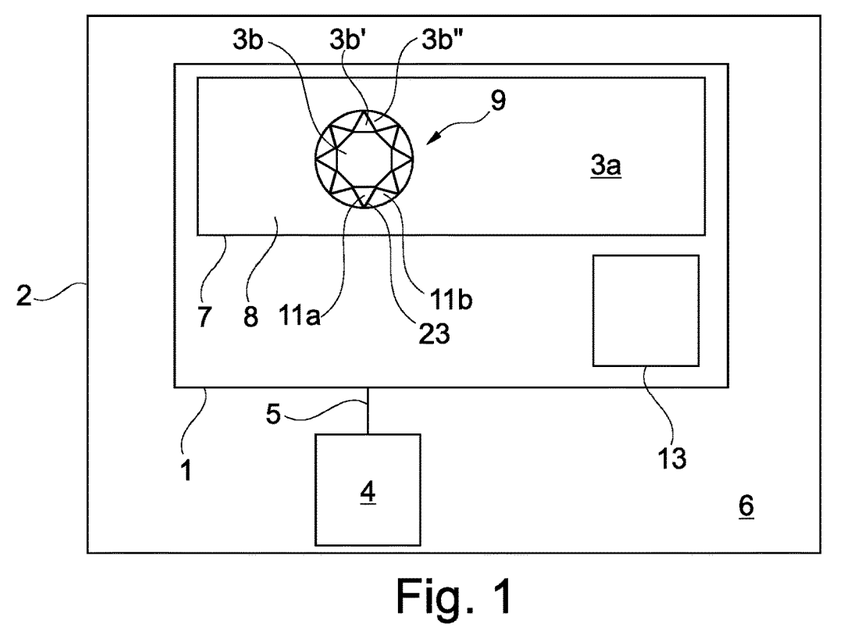
FIG. 1 shows a schematic representation of a user interface comprised by a vehicle according to an embodiment of the invention.

FIG. 1 shows a schematic representation of a user interface 1 comprised by a vehicle 2. The user interface 1 is adapted to present visible information 3a, 3b, 3b', 3b" to a user 4 and adapted to capture user input 5 by a user 4. The user 4 can be a driver of the vehicle 2 and/or a passenger of the vehicle 2. The user 4 can also be a passenger of an autonomously driving vehicle 2.

The user interface 1 is arranged in a cabin 6 of the vehicle 2 so that the user 4 can perceive visible information 3a, 3b, 3b', 3b" output by the user interface 1.

The user interface 1 comprises a two-dimensional display 7, also called a display panel, for displaying information 3a on a display portion 8. The display portion 8 is a section of the two-dimensional display 7 on which information 3a is displayed in a two-dimensional and visibly perceivable manner. However, information 3a that is displayed can also be rendered to appear three-dimensional, e.g., the display 7 may be a display that simulates 3D, e.g., a stereographic or autostereographic display. The two-dimensional display 7 comprises a pixel arrangement, e.g., a pixel matrix with a two-dimensional array of colored pixels that can be illuminated individually. The two-dimensional display 7 does not necessarily refer to a geometric shape of the display, e.g., the display may be curved and/or bent. The two-dimensional display 7, e.g., CID or panorama display, can be curved or bent about one or more axes, optionally to have a shape that follows a section of the cabin 6 of the vehicle 2.

Figure 2:
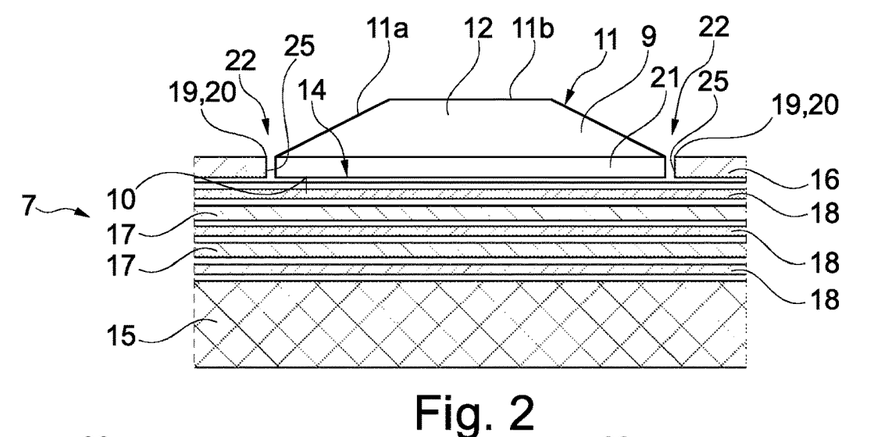
FIG. 2 shows a section of a schematic side view of the user interface shown in FIG. 1.

The user interface 1 comprises an optical faceplate 9 comprising a contact surface 10, a three-dimensional display surface 11 for displaying information 3b, 3b', 3b", and an optic light guide material 12 provided between the contact surface 10 and the three-dimensional display surface 11 (see also FIG. 2). The faceplate 9 is arranged at a front of the display 7. The faceplate 9 is integrated into the display 7 so that an areal extension of the three-dimensional display surface 11 and/or an areal extension of the contact surface 10 is smaller than an areal extension of the display 7, and so that the contact surface 10 is arranged to receive light emitted from the display 7. The faceplate 9 is mounted to the display 7 so that the faceplate 9 covers a partial area of the display 7. The faceplate 9 and its arrangement are also shown in FIG. 2 and further explained with reference thereto.

Thus, the user interface 1 comprises the two-dimensional display 7 and the optical faceplate 9 to output the visibly perceivable information 3a, 3b, 3b', 3b''. The faceplate 9 is a localized touchpoint/affordance with specific user interface content and enables user interactions. In one embodiment, the faceplate 9 is substantially smaller than the display 7, e.g., the larger display 7 has a diagonal of 10 inches to 50 inches and the smaller faceplate 9 has a diagonal, diameter and/or characteristic length of 1 inch to 4 inches.

In one embodiment, the display 7 and the faceplate 9 are touch sensitive, e.g., by providing capacitive or resistive touch sensitivity, to capture user input 5. The user input 5 can be captured by the touch sensitive display 7 as touch user input and relative to the faceplate 9 as user interaction. The user input relative to the faceplate 9 can be captured by the three-dimensional display surface 9 which is touch sensitive.

The user input 5 is transmitted to a processing device 13 that is comprised by the user interface 1. Optionally, the processing device 13 is a data processing device. For receiving the user input 5, the processing device 13 comprises one or more interfaces to receive, and/or one or more data storages to store, data that represents user input 5 captured by the display 7 and/or relative to the faceplate 9. The user interface 1 is adapted to determine a control signal which contains control data to display information 3a, 3b, 3b', 3b'' on the display portion 7 and/or on the faceplate 9.

The user interface 1 can comprise multisensory feedback such as visual feedback as displayed on the two-dimensional display 7, the faceplate 9, other OLED/LCD displays, ambient lighting or projection, mechanical actuation and/or further tactile feedback, audio feedback such as sound effects or music, and/or olfactory feedback (not shown). The user interface 1 optionally provides multimodal interactions, i.e., haptics and the visually perceivable display of information 3a, 3b, 3b', 3b'' are combined and can further be improved by the application of, e.g., an augmented reality or virtual reality head mounted display.

FIG. 2 shows a section of a schematic side view of the user interface 1 shown in FIG. 1. FIG. 2 is described with regard to details of the user interface 1 of FIG. 1.

The faceplate 9 is integrated into the two-dimensional display 7. I.e., the two-dimensional display 7 comprises a contact portion 14 that contacts the contact surface 10 of the faceplate 9 to transmit light that is emitted by the two-dimensional display 7 at the contact portion 14 via the contact surface 10 and the light guide material 12 to the three-dimensional display surface 11 where the transmitted light contains the information 3b, 3b', 3b'' that is visible on the three-dimensional display surface 11. The faceplate 9 is integrated and attached to the display 7 to improve the appearance and robustness.

The two-dimensional display comprises a pixel arrangement 15 and a cover layer 16 covering the pixel arrangement 15. In the embodiment as shown in FIG. 2, the display 7 comprises a plurality of underlying layers 17 beneath the cover layer 16, i.e., the plurality of underlying layers 17 is provided between the pixel arrangement 15 and the cover layer 16. The underlying layers 17 can provide touch sensitivity of the display 7. Between any two layers, an intermediate layer 18 is provided. Each of the intermediate layers 18 can comprise a filler, a sealant and/or an adhesive.

The cover layer 16 comprises a cutout 19 and/or a cavity forming a recess 20 of the two-dimensional display 7. The contact surface 10 of the faceplate 9 is arranged in the recess of the two-dimensional display 7. Thus, the contact portion 14 of the display 7 is arranged in the recess 20 where the contact surface 10 contacts the contact portion 14 of the display 7. The plurality of underlying layers 17, and the intermediate layers 18, are provided between the pixel arrangement 16 and the contact surface 10 of the faceplate 9. This can provide efficient light transmission and mountability and can enable a touch sensitivity of the three-dimensional display surface 11, since light does not need to pass the cover layer 16 when travelling from the pixel arrangement to the contact surface 10. An adhesive in an intermediate layer 18 is an optically clear, ultraviolet cure adhesive with matching optical index that matches the refractive index of the material to be bonded, i.e., the faceplate 9 and/or on or more of the underlying layers 17. In the present application, a matching optical index that matches another refractive index means that the optical index is identical or approximately equal to the other refractive index so that there is no or little optical difference between different materials. I.e., a potential difference between the materials cannot or only difficultly be identified by merely looking through them with the naked eye. If two refractive indices of two layers to be bonded are unequal to each other, the refractive index of an interface (e.g. adhesive) between two layers should be midway or in between the refractive index of the materials to be bonded. This avoids that an increased deviation in refractive index between layers/materials results in increased likelihood of undesirable optical effects or aberrations. Optionally, after the application of the adhesive any excess adhesive is removed, before the adhesive is cured with ultraviolet light.

The faceplate 9 comprises a base 21 provided between the contact surface 10 and the three-dimensional display surface 11. A junction 22 is formed between the faceplate 9 and the display portion 7, i.e., between the base 21 and a lateral surface 25 of the recess 20 (see also FIGS. 3 to 6). The lateral surface 25 defines the boundary of the cutout 19. The cutout 19 is closely toleranced, i.e., controlled, to match the shape and/or size of the faceplate 9, in particular of the base 21. The junction 22 is a minimal gap or controlled to be adapted to be filled for bonding and/or with an optically transparent adhesive to improve the optical appearance of the user interface 1. In this embodiment, the base 21 is a cylindrical base 21 as can be seen from the representations of the faceplate 9 in FIGS. 1 and 2, i.e., the base 21 is an elongated section of the faceplate 9 with an axis and a uniform cross section along the axis. The cutout 19 is a circular cutout forming a circular hole in the cover layer 16. The recess 20 is cylindrically shaped to match the shape of the base 21. As shown in FIG. 2, the base 21 has a height, and the cover layer 16 has a width, wherein the height of the base 21 is equal to the width of the cover layer 16, wherein the height of the base 21 is the elongation of the base 21 along its axis. The base 21 is inset in the cutout 19. The lateral surface 25 extends perpendicular to a front face of the cover layer 16.

In addition to an improved transmission of light, the recessed arrangement of the faceplate 9 can improve a clean and efficient transfer of mechanical actuation to provide haptics across the faceplate 9 and/or the display 7. Additionally, the recessed arrangement of the faceplate 9 enables tuning of haptics so that haptics from multiple actuators can converge or be transferred across the faceplate 9 so that the user 4 feels haptic effect that appears to emanate from the faceplate 9.

The three-dimensional display surface 11 comprises a plurality of surface portions 11a, 11b that are separated from each other by an edge 23 (not-shown in FIG. 2, illustrated in FIG. 1). The faceplate 9 is shaped to provide a three-dimensional surface that the user 4 may touch. For example, the three-dimensional display surface 11 may be faceted, e.g., like a jewel, as schematically shown in FIGS. 1 and 2 or have segmented or continuous concave, convex, and/or organic surface portions, and/or may have a symmetric or asymmetric, round or rectangular shape (not shown). The surface portions 11a, 11b can also be separated differently than by edges 17, e.g., the surface portions 11a, 11b can appear to flow continuously into each other. Also, a combination thereof and edges 17 is possible. In another non-shown embodiment, an edge 23 or a section of the three-dimensional display surface 11 may be virtually simulated or enhanced by the graphical treatment of the GUI, e.g., digitally change the color/material/finish, material/surface rendering and/or lighting can change the appearance of the faceplate 9.

The plurality of edges 23 segments the three-dimensional display surface 11 in a plurality of surface portions 11a, 11b. The user interface 1 is adapted to display information 3b, 3b', 3b" so that the information 3b',3b" that is visible on the plurality of surface portions 11a, 11b can be dependent on or independent of each other. The user interface 1 is adapted to separately determine the information 3b', 3b" that is visible on the plurality of surface portions 11a, 11b. I.e., each segment of the three-dimensional display surface 11 of faceplate 9 can display different information 3b, 3b', 3b". The user interface 1 is adapted to separately capture user input relative to surface portions 11a, 11b of the faceplate 9.

The faceplate 9 can be made of glass or a polymer. As indicated schematically in particular in FIG. 2, the faceplate 9 is a solid body without any cavity to ensure an efficient transmission of light. The light that is transmitted from the contact portion 14 of the two-dimensional display 7 to the three-dimensional display surface 11 leaves the faceplate 9 directly at the boundary between the three-dimensional display surface 11 and a surrounding of the faceplate 9, e.g., air, typically the in the cabin 6 of the vehicle 2. I.e., the light that is transmitted from the contact portion 14 is transmitted through only the solid body of the faceplate 9 and has to pass two boundaries only, namely from the contact portion 14 to the contact surface 10 of the faceplate 9 and from the three-dimensional display surface 11 of the faceplate 9 to the surrounding. This reduces the number of boundaries that the light has to pass when travelling from the contact portion 14 to the user. Thereby, optical losses can be held at a low level and high-quality light-transmission is achieved.

Optionally, the light guide material 12 is a composition of many optical fibers, i.e., fiber optics elements 24 (see also FIGS. 5 to 7 and the description with reference thereto) or similar light guiding material. The light guide material 12 is processed by being drawn and compressed (under heat and pressure) such that the resulting fiber optics elements 24 are on pitch spacing of between 5 and 50 microns or less. Thereby, the faceplate 9 becomes a solid body. The fiber optics elements 24 can be oriented (e.g., as a result of the material processing/formation or the fabrication of the final 3D Faceplate part) to control the viewing angle (i.e., a viewing cone with a central axis longitudinal to an axis of the fiber optics element 24). The viewing angle of a 3D faceplate 9 is determined in whole by the viewing angle of the fiber optics elements 24 that make up the faceplate 9. The faceplate 9 can provide a high-quality transmission of light and a viewing cone suited to the view angle of the user 4 to be used with a high-resolution two-dimensional display 7, e.g., a two-dimensional display 7 with 4k to 8k resolution and/or a pixel density of 600 pixels per inch or more. However, a pixel density of 150 pixels per inch or 200 pixels per inch is also possible and provides adequate resolution.

Figure 3:
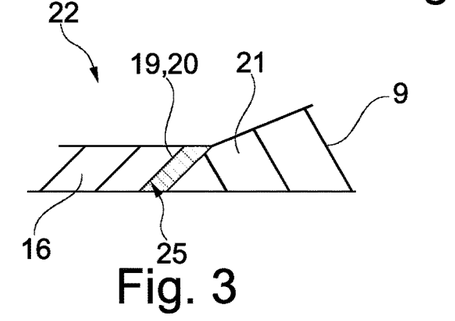
FIGS. 3 and 4 show a detailed side view of embodiments of the junction between a faceplate and a cover layer, each.
Figure 4:
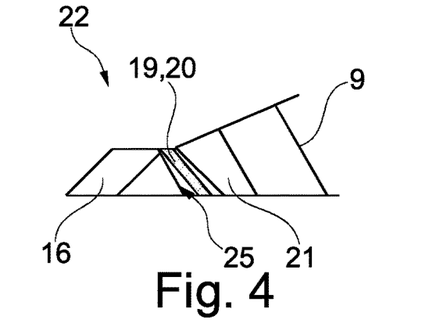

FIGS. 3 and 4 show a detailed side view of embodiments of the junction 22 between a faceplate 9 and a cover layer 16, each. As explained with reference to FIG. 2, a junction 22 is formed between the faceplate 9 and the display portion 7, i.e., between the base 21 and a lateral surface 25 of the recess 20. FIGS. 3 and 4 shown butt joints, i.e., the faceplate 9 and the lateral surface 25 are fitted together via a butt joint. In this embodiment, the lateral surface 25 and a lateral surface section of the faceplate 9 have a complementary shape and are arranged to form the junction 22. An adhesive is provided between the lateral surface 25 and the faceplate 9. In the embodiments of FIGS. 3 and 4, the base 21 is a conical part of the faceplate 9, i.e., an elongated section of the faceplate 9 with an axis and a monotonically increasing or decreasing cross section along the axis. For the sake of a simple representation only, the pixel arrangement 15, and layers of the display 7 between the cover layer 16 and the pixel arrangement 15 are not shown.

In FIG. 3, the lateral surface 25 extends with an acute angle to a front face of the cover layer 16, i.e., angled inwards with respect to the faceplate 9. I.e., at the front face, the cutout 19 is smaller than at an opposite face facing the pixel arrangement 15.

In FIG. 4, the lateral surface 25 extends with an obtuse angle to a front face of the cover layer 16, i.e., angled outwards with respect to the faceplate 9. I.e., at the front face, the cutout 19 is larger than at an opposite face facing the pixel arrangement 15

Figure 5:
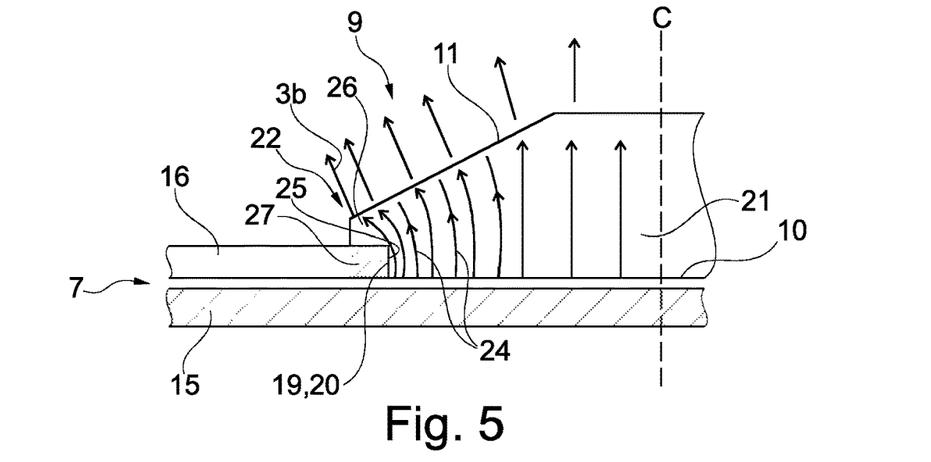
FIGS. 5 and 6 show a detailed side view of a user interface according to an embodiment of the invention, each.
Figure 6:
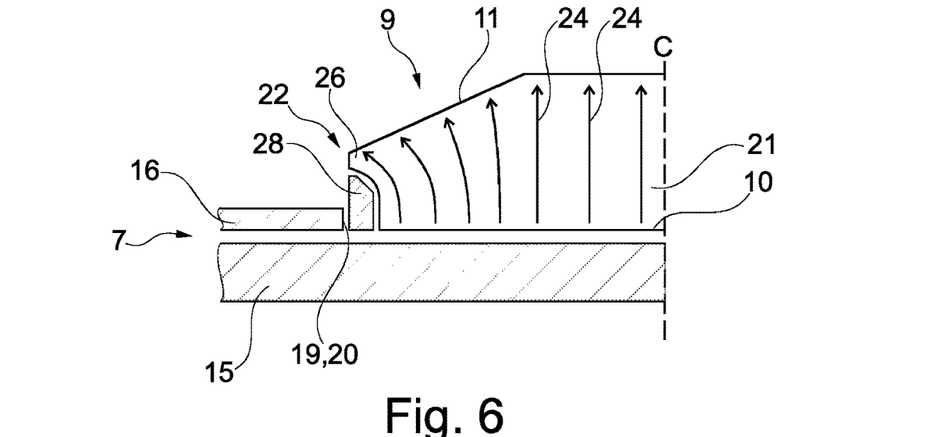

FIGS. 5 and 6 show a detailed side view of a user interface according to an embodiment of the invention, each. For simplicity, any underlying layers 17 and intermediate layers 18 provided between the pixel arrangement 15 and the cover layer 16 are not shown in the figures. The embodiments of FIGS. 5 and 6 are explained with respect to differences to the embodiments described above.

As shown in FIG. 5, the faceplate 9 and the lateral surface 25 of the recess 20 are fitted together via a lap joint. I.e., to form the junction 22, the faceplate 9 comprises a projection 26 forming a step to shift or conceal the junction 22 and a section of the cover layer 16. The junction 22, i.e., the faceplate 9, comprises a section that is parallel to the plane of the display 7 rather than normal to the display 7. The projection 26 is circumferentially arranged along the circumference of the base 21 of the faceplate 9. In other words, the base 21 of the faceplate 9 comprises a step that corresponds to the projection 26, i.e., the base 21 is an elongated section of the faceplate with an axis and comprises two different cross-sectional areas separated from each other by the step. The section of the base 21 that faces the pixel arrangement 15 has a smaller cross-sectional area than the section of the base 21 that overlaps the cover layer 16 and that forms the projection 26. The section of the base 21 that faces the pixel arrangement 15 is inset in the recess 20. The three-dimensional display surface 11 has a cross-sectional area larger than a cross-sectional area of the base 21 where the base 21 is inset in the recess 20. In this embodiment, the junction 22 is completely covered by the projection 26, i.e., the projection 26 overlaps the cover layer 16.

The light guide material 12 of the faceplate 9 comprises fiber optics elements 24 having an axis, each, as indicated by the arrows. The fiber optics elements 24 are arranged so that each of the fiber optics elements 24 is curved between the contact surface 10 and the three-dimensional display surface 11. At the contact surface 10, the fiber optics elements 24 are perpendicular to the contact surface 10. At the three-dimensional display surface 11, the fiber optics elements 24 are perpendicular to the three-dimensional display surface 11. The fiber optics elements 24 enable an efficient and coordinated transmission of light and avoid unwanted visual artifacts, e.g., a visible border, gap, glue junction, and lead to a more seamless and/or borderless appearance. The light guide material 12 of the faceplate 9 comprises portions with differently oriented fiber optics elements 24, namely the faceplate 9 comprises a center C, indicated by the dashed line, and the fiber optics elements 24 are oriented radially outwardly from the center C. The curvature of the fiber optics elements 24 increases from the center C to the edge of the three-dimensional faceplate 9 so that a continuous projection of pixels of the pixel arrangement 15 to the three-dimensional display surface 11 is possible. Pixel appear to reach to the border of the three-dimensional display surface 11.

The display 7 comprises a bezel 27 covering at least a part of the pixel arrangement 15. In this embodiment, the bezel 27 is comprised by, and/or in plane with, the cover layer 16 and forms the junction 22. The projection 26 is arranged so that the three-dimensional display surface 11 overlaps the bezel 27. The fiber optics elements 24 are arranged to extend from the contact surface 10 to the projection 26, i.e., the fiber optics elements 24 are curved so that the fiber optics elements 24 extend from the contact surface 10 to the projection 26. Any section of the three-dimensional display surface 11 that is formed by the projection 26 is reached by one of the fiber optics elements 24. Thus, the fiber optics elements 24 are arranged to conceal the bezel 27 so that the bezel 27 is not visibly perceivable by a user 4. Thus, this effectively conceals the inactive area, i.e., the bezel 27. An assembly structure can also be concealed, e.g., an assembly structure that supports the display 7, the faceplate 9, and an enclosure of the display assembly.

FIG. 6 is described with reference to the differences to the embodiment as shown in FIG. 5. As shown in FIG. 6, the display 7 comprises a ring 28, e.g., a metal trim ring as a secondary element that can be utilized as aesthetic feature or to hide a constructive detail. The ring 28 is arranged along a circumference of the base 21. The ring 28 and the circumference of the base 21 do not need to be circular. The ring 28 acts a confinement element for the faceplate 9.

The junction 22 between the faceplate 9 and the cover layer 16 comprises the ring 28 provided between the faceplate 9 and the cover layer 16. The cutout 19 of the cover layer 16 and/or the recess of the display 7 is adapted to receive the ring 28 and the faceplate 9.

The faceplate 9 comprises a projection 26 so that the three-dimensional display surface 11 overlaps the ring 28. The fiber optics elements 24 are arranged to extend from the contact surface 10 to the projection 26. I.e., the fiber optics elements 24 are curved so that the fiber optics elements 24 extend from the contact surface 10 to the projection 26. Any section of the three-dimensional display surface 11 that is formed by the projection 26 is reached by one of the fiber optics elements 24. Thus, the fiber optics elements 24 are arranged to conceal the ring 28 so that the ring 28 is not visibly perceivable by a user 4. This effectively conceals the inactive area, i.e., the ring 28.

Figure 7:
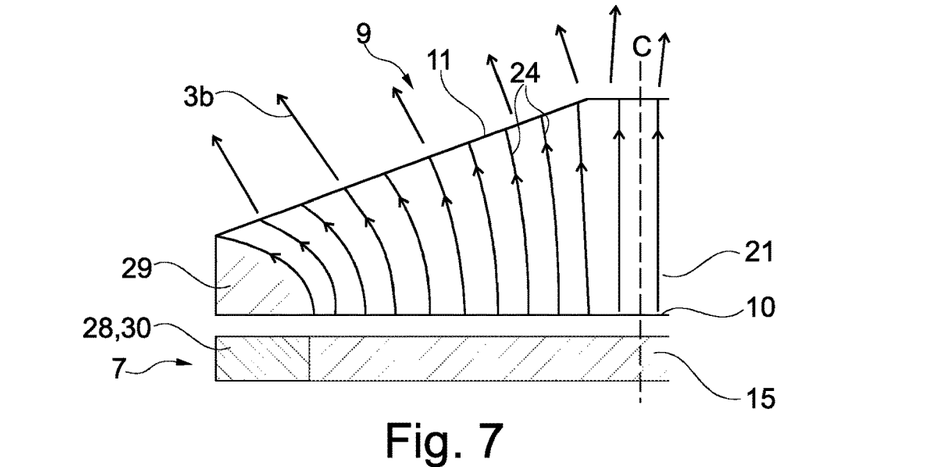
FIG. 7 shows a detailed side view of a section of a user interface.

FIG. 7 shows a detailed side view of a section of a user interface 1 and is described with reference to the differences of the embodiment of FIG. 5.

The light guide material 12 of the faceplate 9 comprises fiber optics elements 24 having an axis each as indicated by the arrows. The fiber optics elements 24 are arranged so that a plurality of the axes of the fiber optics elements 24 enclose an angle of less than 80° with the three-dimensional display surface 11 and so that each of said fiber optics elements 24 is curved between the contact surface 10 and the three-dimensional display surface 11. The curvature of the fiber optics elements 24 increases from the center C to the edge of the three-dimensional faceplate 9 so that a continuous projection of pixels of the pixel arrangement 15 to the three-dimensional display surface 11 is possible. At the contact surface 10, the fiber optics elements 24 are perpendicular to the contact surface 10. At the three-dimensional display surface 11, the plurality of the fiber optics elements 24 enclose an angle of less than 80° with the three-dimensional display surface 11, while at the center C and/or in proximity thereto, the fiber optics elements 24 enclose an angle of 90° with the three-dimensional display surface 11.

In this embodiment, the bezel 28 is arranged below the faceplate 9 as a border section 30 comprised by the display 7 and surrounding the pixel arrangement 15, i.e., the bezel 28 is arranged in one layer with the pixel arrangement 15. The cover layer 16, the cutout 19, the recess 20, and the junction 22 are not shown, e.g., because the recess 20 is formed by the cutout 19 at a non-shown edge of the cover layer 16 diametral oppositely arranged from the bezel 28. In this embodiment, the faceplate 9 comprises a concealing section 29, wherein no light is transmitted through the concealing section 29 to the three-dimensional display surface 29. The fiber optics elements 24 are arranged to conceal the bezel 27 and/or the border section 30 as the bezel 27 and/or the border section 30 is arranged to face the concealing section 29 of the faceplate 9, i.e., the concealing section 29 contacts the bezel 27 and/or the border section 30.

LIST OF REFERENCE SIGNS 1 user interface
2 vehicle
3a, 3b, 3b', 3b" information
4 user
5 user input
5a touch user input
5b user interaction
6 cabin
7 two-dimensional display
8 display portion
9 faceplate
10 contact surface
11 three-dimensional display surface
11a, 11b surface portion
12 light guide material
13 processing device
14 contact portion
15 pixel arrangement
16 cover layer
17 underlying layer
18 intermediate layer
19 cutout
20 recess
21 base 22 junction
23 edge
24 fiber optics elements
25 lateral surface
26 projection
27 bezel
28 ring
29 concealing section
30 border section
C center

What is claimed is:

1. A user interface for a vehicle adapted to present visible information; the user interface comprising:
 a two-dimensional display for displaying information on a display portion, wherein
  the two-dimensional display comprises a pixel arrangement and a cover layer covering the pixel arrangement; and
  the cover layer comprises a cutout forming a recess of the two-dimensional display, and
 an optical faceplate comprising
  a contact surface;
  a three-dimensional display surface for displaying information; and
  an optic light guide material provided between the contact surface and the three-dimensional display surface, wherein
   the contact surface contacts the two-dimensional display to transmit information from the pixel arrangement to the three-dimensional display surface;
   the optical faceplate is integrated into the two-dimensional display; and
   the contact surface of the optical faceplate is arranged in the recess of the two-dimensional display.

2. The user interface of claim 1, wherein the optical faceplate comprises:
 a base provided between the contact surface and the three-dimensional display surface, wherein
  the base has a height, and the cover layer has a width; and
  the height of the base is equal to, or larger than, the width of the cover layer.

3. The user interface of claim 1, wherein the optical faceplate comprises:
 a base provided between the contact surface and the three-dimensional display surface, wherein, the base is inset in the cutout.

4. The user interface of claim 1, wherein the optical faceplate comprises:
 a base provided between the contact surface and the three-dimensional display surface; wherein the three-dimensional display surface has a cross-sectional area larger than a cross-sectional area of the base.

5. The user interface of claim 1, wherein the optical faceplate comprises a projection so that the three-dimensional display surface overlaps the cover layer.

6. The user interface of claim 1, wherein the recess comprises:
 a lateral surface that defines the boundary of the cutout, wherein
  the lateral surface extends perpendicular, with an acute angle, or with an obtuse angle, to a front face of the cover layer.

7. The user interface as claimed in claim 6, wherein the optical faceplate and the lateral surface are fitted together via a butt joint or a lap joint.

8. The user interface of claim 1, wherein the user interface comprises a filler and/or a sealant provided between the contact surface of the optical faceplate and the two-dimensional display.

9. The user interface of claim 1, wherein the user interface comprises an optionally index matching adhesive provided between the contact surface and the two-dimensional display.

10. The user interface of claim 1, wherein the light guide material of the optical faceplate comprises:
 fiber optics elements having an axis each, wherein
  the fiber optics elements are arranged so that each of the axes of the fiber optics elements enclose an angle of less than 90°, preferably less than 80°, with the three-dimensional display surface; and/or
  each of the fiber optics elements is curved between the contact surface and the three-dimensional display surface.

11. The user interface of claim 10, wherein the light guide material of the optical faceplate comprises portions with differently oriented fiber optics elements.

12. The user interface of claim 11, wherein the optical faceplate comprises a center, and the fiber optics elements are oriented radially outwardly from the center.

13. The user interface of claim 10, wherein
 the two-dimensional display comprises a bezel surrounding and/or covering at least a part of the pixel arrangement,
 the optical faceplate comprises a projection so that the three-dimensional display surface overlaps the bezel, and
 the fiber optics elements are arranged to extend from the contact surface to the projection.

14. The user interface of claim 13; wherein the fiber optics elements are arranged to conceal the bezel so that the bezel is not visibly perceivable by a user.

15. A vehicle comprising the user interface of claim 1.

* * * * *